(No Model.)

P. ARBOGAST.
MANUFACTURE OF GLASS LAMPS.

No. 359,489. Patented Mar. 15, 1887.

Witnesses
Inventor
Philip Arbogast
By Connolly Broth & Tyke
Att'ys

UNITED STATES PATENT OFFICE.

PHILIP ARBOGAST, OF PITTSBURG, PENNSYLVANIA.

MANUFACTURE OF GLASS LAMPS.

SPECIFICATION forming part of Letters Patent No. 359,489, dated March 15, 1887.

Application filed July 8, 1885. Serial No. 171,006. (No model.)

*To all whom it may concern:*

Be it known that I, PHILIP ARBOGAST, of Pittsburg, in the county of Allegheny and State of Pennsylvania, have invented certain new and useful Improvements in the Manufacture of Glass Lamps; and I do hereby declare that the following is a full, clear, and exact description of the invention, which will enable others skilled in the art to which it appertains to make and use the same, reference being had to the accompanying drawings, which form a part of this specification.

A form of oil-lamp is now coming in use having a vertical flue passing upwardly through the fount of the lamp and using an annular wick, the air for combustion reaching the wick through the central flue as well as in the ordinary manner.

I have devised a method by which such lamps may be made entirely of glass and in one integral mass.

My invention consists in pressing a tubular foot and, while this is still hot, blowing onto it a lamp-fount and forming a "blow-over" at the point required to constitute the center draft-flue; further, in immediately inserting into the fount a supplemental mold and blowing therein the central tube and causing it to weld itself to the parts already made, and blowing out the bottom of said tube; further, in preventing premature running down of the hot glass in said tubular mold, and thereby thinning its walls, by making the tubular stem practically air-tight until such time as there is enough stiffness acquired to allow of the second blow-over to remove the bottom of said tube; and, further, in the method of preserving the central tube in position by protecting it with the supplemental mold while annealing, substantially as hereinafter fully described and claimed.

The drawings illustrate an apparatus devised by me for the purpose of carrying out my invention. I reserve the right to apply for Letters Patent on said apparatus separately.

Figure 1:
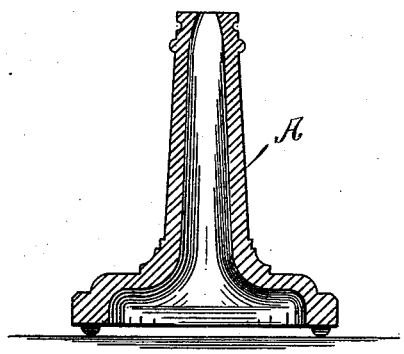
Figure 2:
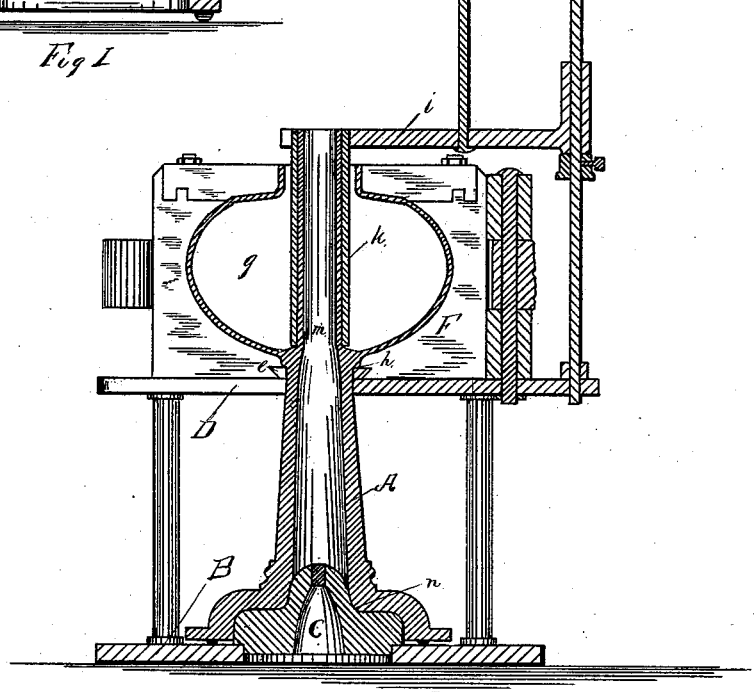

Figure 1 is a vertical section of the tubular foot which I press inverted in the ordinary style of mold. Fig. 2 is a vertical section of my complete apparatus with lamp formed therein.

Immediately after pressing the foot A, I set it into a frame, B, having a boss, C, to receive the cup-foot, and having the plate D, which is slotted to receive the neck or upper portion of the foot A, which extends slightly above said plate D and has a shoulder or bead, *e*, formed on it, as shown in Fig. 2. I at once close in the two-part mold F, shaped to correspond with the fount, *g*, to be formed therein, and having a projection, *h*, adapted to close in under the bead or shoulder *e* of the foot to support it during the remaining operations. Having closed the mold F, I insert the previously-prepared "gathering" while still on the punty and blow till the glass fills out and forms the fount *g*. Continued blowing forces the glass down into the cavity of foot A, making it thinner, until, like an ordinary blowover, it bursts, thus forming the required opening in the bottom of fount *g*. I then slightly withdraw the punty while blowing, and in the ordinary way form a blow-over at the top of mold F. Immediately the swinging arm *i* is provided with a previously-heated supplemental mold, *k*, preferably of very thin iron, which is swung around and lowered into the fount *g* till its lower end about rests on the lower part of the fount. A prepared gathering still on its blow-pipe or punty is quickly lowered into the tubular mold *k* and blown vigorously. This produces the central flue, which at its bottom at once welds itself perfectly to the fount *g*. Continued blowing produces a second blow-over downwardly into the cavity of the foot, and thus the solid bottom of the central flue, *m*, is blown out. The presence of the boss *c* (which I prefer to form with a sort of gasket, *n*, of asbestus) prevents the free escape of air and the consequent running down of the glass intended to form the walls of the tube or flue *m*. As soon as the last bottom blow-over has been effected I slightly withdraw the punty while blowing and readily effect a blow-over at the top of tube *m*. This completes the formation and leaves the three parts—the foot, fount, and central flue—thoroughly welded together. I then disconnect the arm *i* from the supplemental mold *k*, swing the former out of the way, open up the mold F, and remove the lamp to the leer or oven, leaving the mold *k* with it to support the tube

*m* properly in central position. After annealing, the mold *k* is withdrawn. By having a number of these sheet-iron molds *k* sufficient for a "move," and keeping them hot in a small furnace, the operation hereinbefore described may be steadily repeated. The whole manipulation to complete a lamp by this method requires but a few seconds, so that the hot glass will remain at welding temperature long enough to incorporate the parts into one integral structure.

I do not limit myself to any outline or configuration of any of the parts, as that is a mere matter of design, and has no bearing on this invention, which relates to the method of forming the lamp and its parts or members.

The invention is applicable, obviously, to the manufacture of any article other than lamps having a similar foundation to that herein described.

The supplemental mold *k* may, if desired, be removed before placing the lamp in the annealing-furnace.

I claim as my invention—

1. The method of making articles of glassware—such as a lamp-fount—with tubular foot, with a communicating opening between the two, consisting in pressing the tubular foot and, while still hot, blowing onto it the fount and blowing out the obstructing glass to form the communicating opening, substantially as described.

2. The method of making articles of glassware—such as a lamp-fount—with tubular foot and central tube communicating with the cavity of said foot, consisting in first pressing the tubular foot and, while still hot, blowing onto it the fount and blowing out the obstructing glass to form the communicating opening, and then inserting into the fount a supplemental tubular mold and blowing the tube therein, and in turn blowing out the bottom of said tube and allowing the welding of the parts to be effected by their own heat, substantially as described.

3. The method of making articles of glassware—such as a lamp-fount—having an open-bottomed central tube welded at its junction with the fount-bottom, consisting in blowing the fount in a mold, blowing out the desired opening in its bottom, and then inserting a supplemental tube-mold and blowing a tube therein, removing the top and bottom of said tube by overblows, substantially as described.

In testimony that I claim the foregoing as my own I have hereto affixed my signature in presence of two witnesses.

PHILIP ARBOGAST.

Witnesses:
 JNO. F. ATCHESON,
 A. A. CONNOLLY.